US011655531B2

(12) United States Patent
Yanik et al.

(10) Patent No.: US 11,655,531 B2
(45) Date of Patent: May 23, 2023

(54) HOT DIP COATED STEEL STRIP HAVING AN IMPROVED SURFACE APPEARANCE AND METHOD FOR PRODUCTION THEREOF

(71) Applicants: ThyssenKrupp Steel Europe AG, Duisburg (DE); thyssenkrupp AG, Essen (DE)

(72) Inventors: Robert Yanik, Neukirchen-Vluyn (DE); Friedhelm Macherey, Alpen (DE); Bastian Schöntaube, Willich (DE); Frank Vennemann, Dinslaken (DE); Jennifer Schulz, Unna (DE); Folkert Schulze-Kraasch, Duisburg (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 16/647,747

(22) PCT Filed: Sep. 14, 2018

(86) PCT No.: PCT/EP2018/074928
§ 371 (c)(1),
(2) Date: Mar. 16, 2020

(87) PCT Pub. No.: WO2019/057635
PCT Pub. Date: Mar. 28, 2019

(65) Prior Publication Data
US 2020/0224300 A1    Jul. 16, 2020

(30) Foreign Application Priority Data
Sep. 19, 2017 (DE) .................. 10 2017 216 572.3

(51) Int. Cl.
| C23C 2/20 | (2006.01) |
| B32B 15/01 | (2006.01) |
| C22C 18/04 | (2006.01) |
| C22C 38/00 | (2006.01) |
| C22C 38/02 | (2006.01) |
| C22C 38/06 | (2006.01) |
| C22C 38/42 | (2006.01) |
| C22C 38/44 | (2006.01) |
| C22C 38/50 | (2006.01) |
| C22C 38/54 | (2006.01) |
| C22C 38/58 | (2006.01) |
| C23C 2/00 | (2006.01) |
| C23C 2/06 | (2006.01) |
| C23C 2/40 | (2006.01) |

(52) U.S. Cl.
CPC ............. *C23C 2/20* (2013.01); *B32B 15/012* (2013.01); *B32B 15/013* (2013.01); *C22C 18/04* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/50* (2013.01); *C22C 38/54* (2013.01); *C22C 38/58* (2013.01); *C23C 2/003* (2013.01); *C23C 2/06* (2013.01); *C23C 2/40* (2013.01)

(58) Field of Classification Search
CPC ........ B32B 15/012; B32B 15/013; C23C 2/20
See application file for complete search history.

(56) References Cited

U.S. PATENT DOCUMENTS

| 3,619,247 | A |   | 11/1971 | Newport et al. |
| 3,667,425 | A | * | 6/1972 | Bozeman .................. C23C 2/20 |
|           |   |   |        | 118/63 |
| 3,681,118 | A |   | 8/1972 | Ohama et al. |
| 4,171,392 | A | * | 10/1979 | Sievert .................... C23C 2/006 |
|           |   |   |        | 148/533 |
| 4,812,371 | A | * | 3/1989 | Shindou .................... C23C 2/06 |
|           |   |   |        | 420/514 |
| 5,399,376 | A |   | 3/1995 | Flinchum et al. |
| 5,518,772 | A |   | 5/1996 | Andachi et al. |
| 2009/0297881 | A1 |   | 12/2009 | Maalman et al. |
| 2010/0006184 | A1 |   | 1/2010 | Takeda et al. |
| 2011/0008546 | A1 | * | 1/2011 | Suzuki .................... C22C 1/002 |
|           |   |   |        | 427/431 |

(Continued)

FOREIGN PATENT DOCUMENTS

| CN | 103282533 A | 9/2013 |
| CN | 105296907 A | 2/2016 |

(Continued)

OTHER PUBLICATIONS

German Office Action for DE Application No. 10 2017 216 572.3 dated May 22, 2018.
International Search Report and Written Opinion for International Application No. PCT/EP2018/074928 dated Dec. 19, 2018 with English Translation.
Metallic coatings—Measurement of coating thickness—X-ray spectrometric methods (DIN EN ISO 3497, 2001.

(Continued)

*Primary Examiner* — Adam Krupicka
(74) *Attorney, Agent, or Firm* — RMCK Law Group PLC

(57) ABSTRACT

The present invention relates to a method of hot dip coating of flat steel products, comprising a step of stripping the coated steel strip by means of at least one nozzle that emits a stripping gas having a temperature $T_3$ at an angle α in the direction of the coated steel strip, wherein the angle α, the distance h between the surface of the melt bath and the lower edge of the nozzle in mm, the temperature of the stripping gas in ° C. and the differential between the temperature $T_2$ of the melt bath and the temperature $T_1$ of the steel strip are in a particular relationship to one another, and to a correspondingly produced hot dip-coated flat steel product.

16 Claims, No Drawings

(56) References Cited

U.S. PATENT DOCUMENTS

| | | |
|---|---|---|
| 2012/0107636 A1 | 5/2012 | Diez et al. |
| 2012/0164474 A1 | 6/2012 | Hueffer et al. |
| 2013/0295410 A1 | 11/2013 | Takahashi et al. |
| 2015/0209848 A1 | 7/2015 | Kopplin et al. |
| 2015/0292072 A1 | 10/2015 | Mataigne et al. |
| 2016/0002763 A1 | 1/2016 | Diez et al. |
| 2018/0171460 A1 | 6/2018 | Tokuda |
| 2018/0202016 A1* | 7/2018 | Yokoyama ............ C22C 38/02 |

FOREIGN PATENT DOCUMENTS

| | | |
|---|---|---|
| CN | 106795614 A | 5/2017 |
| DE | 152143 A1 | 11/1981 |
| DE | 69329831 | 4/2001 |
| DE | 202005022081 U1 | 3/2013 |
| DE | 102012017703 A1 | 3/2014 |
| DE | 202014008863 U1 | 12/2014 |
| DE | 112014000102 | 3/2015 |
| DE | 202014010854 U1 | 12/2016 |
| EP | 2559782 A1 | 2/2013 |
| EP | 2837707 A1 | 2/2015 |
| EP | 2430207 B1 | 1/2017 |
| EP | 3205741 A1 | 8/2017 |
| EP | 2837707 B1 | 6/2018 |
| JP | H0925537 A | 1/1997 |
| JP | 2010018874 A | 1/2010 |
| JP | 2012511102 A | 5/2012 |
| JP | 2012117148 A | 6/2012 |
| JP | 2013007095 A | 1/2013 |
| WO | 2006002843 A1 | 1/2006 |
| WO | 2012120020 A1 | 9/2012 |
| WO | 2016035200 A1 | 3/2016 |

OTHER PUBLICATIONS

Chinese Office Action for CN Application No. 201880060818.9 dated Jul. 5, 2021.

Luo, W. "Method of Surface Waviness Testing for Automotive Steel Sheets" PTCA, 2015.

Japanese Office Action for JP Application No. 2020-515952 dated Sep. 20, 2022.

* cited by examiner

HOT DIP COATED STEEL STRIP HAVING AN IMPROVED SURFACE APPEARANCE AND METHOD FOR PRODUCTION THEREOF

CROSS-REFERENCE TO RELATED APPLICATIONS

This application is a 371 U.S. National Stage of International Application No. PCT/EP2018/074928, filed Sep. 14, 2018, which claims the benefit of DE Application No. 10 2017 216 572.3 filed Sep. 19, 2017. The disclosures of the above applications are incorporated herein by reference in their entirety.

TECHNICAL FIELD

The present invention relates to a method of hot dip coating of flat steel products, and to a correspondingly produced hot dip-coated flat steel product.

TECHNICAL BACKGROUND

Methods of coating flat steel products with a corrosion-protective coating based on Zn or on Zn and magnesium are known per se to the person skilled in the art.

DE 20 2014 010 854 U1 and DE 20 2014 008 863 U1 each disclose steel sheets having a coating comprising Zn and aluminum. These sheets have a $Wa_{0.8}$, which is a measure of the long-range corrugation of the surface of the coating, of not more than 0.43 μm. The production method which is disclosed in this document comprises the coating of a cold strip by hot dip galvanizing, meaning that the uncoated strip is guided through a melt bath containing the coating components. Excess coating material is stripped off with nitrogen in the liquid state in order to obtain a thin coating.

DE 11 2014 000 102 T5 discloses a process for producing a Zn—Al-coated sheet with optimized stripping. In order to obtain a surface featuring a low $Wa_{0.8}$ of not more than 0.55 μm, it is necessary according to this publication to maintain a very exactly defined relationship of distance between nozzle and sheet, average nozzle height, stripping gas pressure, running speed of the strip to be coated, and proportion by volume of oxygen in the stripping gas.

US 2012/0107636 A1 discloses a method of coating steel strips with a corrosion-protective coating, in which, after dipping into a melt bath containing the coating components in molten form, excess coating material is stripped off by means of nozzles. This is done using a stripping gas having low oxidation capacity. In addition, the coated steel strip is guided through a box in the course of treatment with the stripping gas.

The methods disclosed in the prior art for coating of flat steel products with corrosion-protective coatings and the products produced are still in need of improvement with regard to their surface characteristics. More particularly, it is desirable to configure the surface of the corrosion-protective coating in such a way that a paint applied meets high quality demands, such that the application of a primer or undercoat can be dispensed with.

It is therefore an object of the present invention to provide a method of producing a flat steel product provided with a corrosion-protective coating that has a visually appealing surface that can be painted without use of a primer or undercoat and meets high quality demands.

These objects are achieved by the method of the invention for production of a steel strip having a corrosion-protective coating, at least comprising the following steps:

(A) conducting the steel strip having a temperature $T_1$ through a melt bath having a temperature $T_2$, containing the elements of the corrosion-protective coating in molten form, in order to obtain a coated steel strip, (B) stripping the coated steel strip by means of at least one nozzle that emits a stripping gas having a temperature $T_3$ at an angle α in the direction of the coated steel strip, wherein the value Q is ≤6.956 with $$Q = \frac{3.76 + (\alpha * (10 + 6.3 * h))}{10 - 0.86 * T_3^2 + 4.82 * \Delta T} \quad (I)$$

in which
α is the angle between a theoretical straight line perpendicular to the coated steel strip and pointing through the middle of the at least one nozzle, and the nozzle direction set, in °,
h is the distance between the surface of the melt bath and the lower edge of the nozzle in mm,
$T_3$ is the temperature of the stripping gas in ° C.,
ΔT is the difference between the temperature $T_2$ of the melt bath and the temperature $T_1$ of the steel strip in ° C., and.

The individual steps of the method of the invention are described in detail hereinafter.

The method of the invention can be performed batchwise or continuously. In a preferred embodiment, it is performed continuously.

Step (A) of the method of the invention comprises the conducting of the steel strip having a temperature $T_1$ through a melt bath having a temperature $T_2$ and containing the elements of the corrosion-protective coating in molten form, in order to obtain a coated steel strip.

In the method of the invention, it is generally possible to use any steel strips known to the person skilled in the art. In a preferred embodiment, the steel strip used in the method of the invention comprises, as well as Fe and unavoidable impurities (all figures in % by weight):
0.00 to 0.3, more preferably 0.0001 to 0.3, most preferably 0.0001 to 0.2, C,
0.00 to 1.50, more preferably 0.0005 to 0.50, most preferably 0.0005 to 0.45, Si,
0.01 to 4.00, more preferably 0.05 to 2.50, most preferably 0.05 to 2.0, Mn,
0.00 to 0.10, more preferably 0.001 to 0.07, most preferably 0.001 to 0.06, P,
0.00 to 0.02, more preferably 0.00 to 0.012, S,
0.001 to 2.20, more preferably 0.01 to 1.5, most preferably 0.01 to 1.3, Al,
up to 0.2, more preferably up to 0.15, Ti+Nb,
up to 1.50, more preferably 0.001 to 0.9, Cr+Mo,
up to 0.25, more preferably up to 0.02, V,
up to 0.01, more preferably up to 0.009 N,
0.00 to 0.20, more preferably 0.001 to 0.15, Ni,
up to 0.01, more preferably up to 0.005, B and
up to 0.01 Ca.

The steel strips used in the method of the invention may be obtained, for example, by hot rolling slabs obtained from a corresponding melt. According to the invention, this hot strip, which is known to the person skilled in the art, may be in a customary thickness and width.

In a further possible embodiment, said hot strip is cold-rolled in order to obtain what is called a cold strip. According to the invention, this cold strip, which is known to the person skilled in the art, may be in a customary thickness and width.

In general, the steel strip used in step (A) of the method of the invention may have any microstructure known to be suitable to the person skilled in the art. In a preferred embodiment, the steel strip used consists of a dual-phase steel, a bake-hardened steel or an IF steel.

Prior to step (A) of the method of the invention, the steel strip can be pretreated by methods known to the person skilled in the art, for example a cleaning, degreasing, pickling, recrystallizing annealing, decarburization. Corresponding methods are known per se to the person skilled in the art and are described, for example, in A. R. Marder, The metallurgy of zinc-coated steel sheet, Progress in Materials Science 45 (2000), pages 191 to 271.

In step (A) of the method of the invention, the steel strip having a temperature $T_1$ is guided through a melt bath having a temperature $T_2$.

For example, the temperature of the steel strip $T_1$ in the method of the invention is 400 to 550° C., preferably 400 to 500° C. According to the invention, the steel strip according to the present invention, prior to step (A), is brought to said temperature $T_1$ by heating. The temperature $T_2$ of the melt bath used in step (A) in the method of the invention is, for example, 400 to 650° C., preferably 440 to 600° C.

The inventors of the present invention have found that, in conjunction with further parameters, the differential between the temperature $T_2$ of the melt bath and the temperature $T_1$ of the steel strip $\Delta T$ has a distinct effect on the surface of the steel strip bearing a corrosion-protective coating. According to the invention, $\Delta T$ is preferably −60 to +120° C., more preferably −55 to +115° C.

The melt bath used in accordance with the invention contains the elements present in the corrosion-protective coating. The melt bath used in accordance with the invention preferably contains, as well as Zn and unavoidable impurities, 0.1% to 2.0% by weight of Al and optionally 0.1% to 3.0% by weight of Mg.

The melt bath used in accordance with the invention therefore contains, in a first preferred embodiment, as well as Zn and unavoidable impurities, 0.1% to 2.0% by weight of Al, preferably 0.05% to 0.4% by weight of Al.

In a second embodiment, the melt bath used in accordance with the invention contains, as well as Zn and unavoidable impurities, 0.1% to 2.0% by weight of Al, preferably 1.0% to 2.0% by weight of Al, and 0.1% to 3.0% by weight of Mg, preferably 1.0% to 2.0% by weight of Mg.

The providing of such a melt bath at a corresponding temperature $T_2$ is known per se to the person skilled in the art and is described, for example, in A. R. Marder, The metallurgy of zinc-coated steel sheet, Progress in Materials Science 45 (2000), pages 191 to 271, described.

In a preferred embodiment, the steel strip, in step (A) of the method of the invention, is guided through the melt bath in such a way that it emerges therefrom again in a perpendicular or virtually perpendicular manner. During the conducting of the steel strip through the melt bath, the corresponding melt adheres to the surface of the steel strip.

Preferably, the coated steel strip obtained after step (A) of the method of the invention is transferred directly into step (B) of the method of the invention.

Step (B) of the method of the invention comprises the stripping of the coated steel strip by means of at least one nozzle that emits a stripping gas having a temperature $T_3$ at an angle α in the direction of the coated steel strip.

According to the invention, α is understood to mean the angle between a theoretical straight line perpendicular to the coated steel strip and pointing through the middle of the at least one nozzle, and the nozzle direction set. The angle α is reported in °.

According to the invention, a positive value of α means that the nozzle direction set has been rotated relative to the theoretical straight line perpendicular to the coated steel strip and pointing through the middle of the at least one nozzle in the direction of movement of the strip. In the preferred embodiment that the coated steel strip leaves the melt bath vertically upward, a positive value of α thus means that the nozzle has been turned upward.

According to the invention, a negative value of α means that the nozzle direction set has been rotated relative to the theoretical straight line perpendicular to the coated steel strip and pointing through the middle of the at least one nozzle counter to the direction of movement of the strip. In the preferred embodiment that the coated steel strip leaves the melt bath vertically upward, a negative value of α thus means that the nozzle has been turned downward.

According to the invention, α is preferably −5.0° to +5.0°, preferably −4.0° to +4.0°.

According to the invention, h describes the distance between the surface of the melt bath and the lower edge of the nozzle in mm. On performance of the method of the invention, the surface of the melt bath is generally not at rest but moving in the form of waves. In this case, according to the invention, in the determination of the distance h, the surface of the melt bath used is the average height of the surface of the melt bath. According to the invention, the distance h between the surface of the melt bath and the lower edge of the nozzle is, for example, 50 to 800 mm, preferably 80 to 700 mm.

According to the invention, $T_3$ describes the temperature of the stripping gas in ° C. According to the invention, $T_3$ is, for example, 15 to 50° C., preferably 20 to 40° C. According to the invention, it is possible that the stripping gas is heated to a corresponding temperature $T_3$ before leaving the nozzle. Apparatuses for the purpose are known per se to the person skilled in the art. According to the invention, the stripping gas used may be any stripping gas or stripping gas mixture that seems suitable to the person skilled in the art. The present invention preferably relates to the method of the invention wherein the stripping gas which is used in step (B) is selected from the group consisting of nitrogen or a mixture of nitrogen, oxygen and unavoidable impurities.

According to the invention, the pressure p with which the stripping gas leaves the nozzle is, for example, 50 to 800 mbar, preferably 100 to 600 mbar.

In step (B) of the method of the invention, the distance of the nozzle from the strip is, for example, 4 to 15 mm, preferably 6 to 12 mm.

The value Q which is essential to the invention is determined by the following formula (I):

$$Q = \frac{3.76 + (\alpha * (10 + 6.3 * h))}{10 - 0.86 * T_3^2 + 4.82 * \Delta T} \tag{I}$$

in which

α is the angle between a theoretical straight line perpendicular to the coated steel strip and pointing through the middle of the at least one nozzle, and the nozzle direction set, in °, h is the distance between the surface of the melt bath and the lower edge of the nozzle in mm, $T_3$ is the temperature of the stripping gas in ° C., and ΔT is the difference between the temperature $T_2$ of the melt bath and the temperature $T_1$ of the steel strip in ° C.

The parameters α, h, $T_3$ and ΔT are explained in detail further up.

It is essential to the invention that the value Q that can be calculated by formula (I) is not more than 6.956. If the value Q is not more than 6.956, what are obtained are steel strips coated in accordance with the invention that have a particularly advantageous surface; in particular, long-range corrugation judged by the value wsa_mod is advantageous. If the Q value obtained from formula (I) is not more than 6.956, the quotient of the wsa_mod values, measured in longitudinal and cross direction (see formula (II)), of the surface of the corrosion-protective surface is preferably 0.700 to 1.290. If the Q value obtained from formula (I) is greater than 6.956, a disadvantageous quotient of the wsa_mod values, measured in longitudinal and cross direction (see formula (II)), of the surface of the corrosion-protective surface of not less than 1.300 is obtained.

Preferably in accordance with the invention, a quotient of the wsa_mod values, measured in longitudinal and cross direction, according to the following formula (II) that has a value of 0.700 to 1.290 is obtained:

$$0.700 \leq \left(\frac{Wsa_{mod}\text{long}}{Wsa_{mod}\text{cross}}\right) \leq 1.290 \quad (II)$$

The surface of the coating obtained in accordance with the invention has a particularly advantageous ratio of Wsa_mod in longitudinal direction to Wsa_mod in cross direction. When the present application mentions a wsa_mod value, this refers solely to the intrinsic corrugation of the anticorrosion layer, i.e. the coating of the coated sheet. The wsa_mod value derived from the measurement of the application distribution of the anticorrosion layer by means of a spatially resolved scanning x-ray fluorescence analysis (Fischerscope X-Ray) to DIN EN ISO 3497 on areas of size 20×20 mm. The limiting wavelengths for determination of the wsa_mod value are λc=1 mm and λf=5 mm. The limiting wavelength is that wavelength at which the profile filter reduces the amplitude of a sine wave to 50%. It can be regarded as a measure of the boundary between roughness and waviness. The limiting wavelength λf delimits corrugation from longer wavelengths.

After step (B) of the method of the invention, the corrosion-protective layer has a thickness of, for example, 0.1 to 20 μm, preferably 1 to 10 μm.

The method of the invention affords coatings in which the $Fe_2Al_5$ particles present have particularly low grain diameters. Therefore, the present invention relates more particularly to the method of the invention wherein $Fe_2Al_5$ particles present in the coating have an average grain diameter of ≤210 nm in coatings containing, especially consisting of, Zn, Mg and Al, and of ≤565 nm in coatings containing, especially consisting of, Zn and Al.

After step (B) of the method of the invention, the coated steel strip can be sent to further method steps. These are known per se to the person skilled in the art and include, for example, single or repeated skin pass rolling, stretcher leveling, heat treatment, especially for production of an alloy layer, surface coating, for example oiling, application of forming aids, chemical passivations, sealing operations, coiling, drying, trimming etc.

The present invention also relates to a steel strip provided with a corrosion-protective coating, produced by the inventive a method. The method of the invention comprising at least steps (A) and (B) affords a coated steel strip having particularly low long-wave corrugation, such that a paint can be applied without the additional use of a primer or undercoat, and a painted surface that meets high quality demands is obtained.

The present invention also relates to a steel strip provided with a corrosion-protective coating, characterized in that the coating has a ratio of Wsa_mod in longitudinal direction to Wsa_mod in cross direction of 0.700 to 1.290. The wsa_mod value is determined by the method mentioned above.

The present invention preferably relates to a steel strip of the invention, wherein the corrosion-protective coating contains, as well as Zn and unavoidable impurities, 0.1% to 2.0% by weight of Al and optionally 0.1% to 3% by weight of Mg.

The details and preferred embodiments given with regard to the method of the invention are correspondingly applicable to the steel strip of the invention.

The present invention further relates to the use of a steel strip of the invention in the automotive sector, especially for utility vehicles, especially trucks, construction machinery and earthmoving vehicles, in the industrial sector, for example as housing or telescopic slides, in the construction sector, for example as facade elements, for domestic appliances, in the energy sector, in shipbuilding.

The details and preferred embodiments given for the method of the invention and the steel strip of the invention are correspondingly applicable to the use of the invention.

EXAMPLES

The working examples that follow serve to further illustrate the invention.

A steel strip having the following composition (all figures in % by weight) 0.075 C, 0.1 Si, 1.53 Mn, 0.010 P, 0.001 S, 0.035 Al, 0.53 Cr, 0.05 Cu, 0.05 Mo, 0.0025 N, 0.025 $T_1$, 0.05 Ni, 0.0030 B, balance: Fe and unavoidable impurities, is coated under the conditions specified in table 1 with melt baths containing the alloy constituents specified in table 1. After application of the protective layer, the wsa_mod value is determined on the surface thereof by the method described above. This is done by taking sheet samples from the steel strip and measuring in longitudinal and cross direction. Then the quotient of the wsa_mod value for longitudinal direction and the value for cross direction is determined.

It is clearly apparent from table 1 that the inventive examples having a Q value of less than 6.956 result in corresponding coated steel strips that feature an advantageous quotient of the wsa_mod values, whereas, in comparative experiments in which the Q value is above 6.956, distinctly poorer quotients of the wsa_mod values and hence surface qualities are obtained.

TABLE 1

Examples and comparative examples

| Ser. No. | Zn content [% by wt.] | Mg content [% by wt.] | Al content [% by wt.] | $\Delta T$ [° C.] | T3 [° C.] | h [mm] | $\alpha$ [°] | Average grain diameter [nm] | Wsa_mod_long/ Wsa_mod_cross | Q |
|---|---|---|---|---|---|---|---|---|---|---|
| 1 | 99.771 | — | 0.229 | 35 | 35 | 330 | −2.4 | 540 | 1.077 | 5.73 |
| 2 | 99.786 | — | 0.214 | 15 | 34 | 250 | −2.1 | 510 | 1.154 | 3.65 |
| 3 | 99.785 | — | 0.215 | 18 | 35 | 240 | −2.1 | 515 | 1.167 | 3.34 |
| 4 | 99.779 | — | 0.221 | 13 | 32 | 260 | −2.4 | 530 | 1.231 | 4.89 |
| 5 | 99.768 | — | 0.232 | 15 | 30 | 260 | −2.4 | 550 | 1.286 | 5.71 |
| 6 | 99.775 | — | 0.225 | 19 | 29 | 270 | −2.1 | 535 | 1.267 | 5.77 |
| 7 | 99.781 | — | 0.219 | 18 | 31 | 290 | −2.2 | 525 | 1.231 | 5.53 |
| 8 | 99.772 | — | 0.228 | 20 | 30 | 302 | −2.2 | 540 | 1.267 | 6.30 |
| V9 | 99.750 | — | 0.250 | 20 | 25 | 330 | −2.6 | 605 | 1.467 | 12.59 |
| V10 | 99.760 | — | 0.240 | 22 | 26 | 300 | −2.4 | 585 | 1.429 | 9.79 |
| V11 | 99.762 | — | 0.238 | 22 | 24 | 290 | −2.6 | 585 | 1.438 | 12.58 |
| V12 | 99.764 | — | 0.236 | 24 | 26 | 310 | −2.4 | 570 | 1.333 | 10.33 |
| V13 | 99.767 | — | 0.233 | 24 | 26 | 300 | −2.5 | 570 | 1.308 | 10.42 |
| V14 | 99.751 | — | 0.249 | 26 | 23 | 330 | −2.7 | 595 | 1.571 | 17.64 |
| V15 | 99.757 | — | 0.243 | 26 | 24 | 250 | −2.5 | 590 | 1.389 | 11.00 |
| 16 | 99.900 | — | 0.100 | 11 | 29 | 260 | −2.2 | 450 | 1.188 | 5.49 |
| V17 | 99.500 | — | 0.500 | −31 | 27 | 350 | −2.8 | 655 | 1.316 | 8.09 |
| 18 | 99.900 | — | 0.100 | 9 | 39 | 265 | −5.0 | 445 | 1.270 | 6.69 |
| 19 | 99.890 | — | 0.110 | −4 | 32 | 285 | −3.0 | 455 | 1.227 | 6.08 |
| 20 | 99.869 | — | 0.131 | 110 | 28 | 270 | 0.5 | 475 | 1.217 | −6.41 |
| 21 | 99.825 | — | 0.175 | −51 | 39 | 280 | −2.2 | 500 | 1.143 | 2.53 |
| 22 | 99.800 | — | 0.200 | 19 | 34 | 304 | 5.0 | 505 | 1.263 | −10.79 |
| 23 | 99.785 | — | 0.215 | 20 | 33 | 100 | −2.1 | 510 | 1.250 | 1.61 |
| 24 | 99.777 | — | 0.223 | 57 | 35 | 270 | −2.1 | 530 | 1.200 | 4.67 |
| 25 | 99.769 | — | 0.231 | 10 | 31 | 600 | −1.2 | 550 | 1.222 | 5.91 |
| 26 | 97.772 | 1.058 | 1.170 | 7 | 33 | 240 | −2 | 165 | 1.100 | 3.41 |
| 27 | 97.758 | 1.052 | 1.190 | 23 | 30 | 270 | −2.1 | 170 | 1.200 | 5.50 |
| 28 | 97.724 | 1.066 | 1.210 | 17 | 37 | 422 | −2.4 | 175 | 1.182 | 5.90 |
| 29 | 97.779 | 1.061 | 1.160 | 15 | 33 | 250 | −2.1 | 165 | 1.091 | 3.89 |
| 30 | 97.528 | 1.059 | 1.413 | 22 | 31 | 315 | −2.3 | 205 | 1.273 | 6.45 |
| 31 | 97.572 | 1.058 | 1.370 | 18 | 33 | 280 | −2.3 | 185 | 1.182 | 4.85 |
| V32 | 97.536 | 1.052 | 1.412 | 25 | 29 | 310 | −2.3 | 215 | 1.310 | 7.61 |
| 33 | 97.563 | 1.057 | 1.380 | 20 | 32 | 290 | −2.3 | 190 | 1.200 | 5.45 |
| V34 | 97.538 | 1.051 | 1.411 | 23 | 25 | 340 | −2.4 | 215 | 1.364 | 12.39 |
| 35 | 97.698 | 1.052 | 1.250 | 40 | 35 | 300 | −2.5 | 180 | 1.077 | 5.58 |
| 36 | 97.520 | 1.063 | 1.417 | 25 | 31 | 300 | −2.4 | 205 | 1.250 | 6.55 |
| 37 | 97.693 | 1.067 | 1.240 | 21 | 31 | 260 | −2.2 | 175 | 1.182 | 5.06 |
| 38 | 97.684 | 1.056 | 1.260 | 19 | 34 | 260 | −2.2 | 180 | 1.167 | 4.06 |
| V39 | 97.459 | 1.066 | 1.475 | 23 | 25 | 400 | −2.5 | 230 | 1.364 | 15.17 |
| V40 | 97.526 | 1.054 | 1.420 | 28 | 27 | 330 | −2.3 | 220 | 1.333 | 9.96 |
| V41 | 97.600 | 1.000 | 1.400 | 10 | 28 | 330 | −2.5 | 215 | 1.310 | 8.47 |
| 42 | 97.000 | 2.000 | 1.000 | 25 | 32 | 314 | −2.3 | 160 | 1.273 | 6.09 |
| V43 | 96.950 | 1.050 | 2.000 | 30 | 31 | 325 | −2.5 | 260 | 1.310 | 7.65 |
| 44 | 97.787 | 1.063 | 1.150 | −9 | 34 | 240 | 0.5 | 165 | 1.083 | −0.74 |
| 45 | 97.609 | 1.061 | 1.330 | −5 | 32 | 280 | −3.0 | 185 | 1.182 | 5.94 |
| 46 | 97.548 | 1.052 | 1.400 | −40 | 34 | 250 | −2.4 | 205 | 1.067 | 3.23 |
| 47 | 97.591 | 1.052 | 1.357 | −50 | 39 | 285 | −2.4 | 185 | 0.786 | 2.81 |
| 48 | 97.550 | 1.050 | 1.400 | 52 | 34 | 275 | −2.2 | 200 | 1.231 | 5.22 |
| 49 | 97.557 | 1.053 | 1.390 | 7 | 39 | 260 | −5.0 | 190 | 1.143 | 6.51 |
| 50 | 97.890 | 1.060 | 1.050 | 6 | 39 | 600 | −2.3 | 160 | 1.182 | 6.87 |
| 51 | 97.539 | 1.049 | 1.412 | 108 | 32 | 275 | 0.5 | 195 | 1.059 | −2.50 |
| 52 | 97.592 | 1.058 | 1.350 | 18 | 25 | 100 | −2.1 | 180 | 1.000 | 3.04 |
| 53 | 97.599 | 1.064 | 1.337 | −5 | 31 | 290 | −3.0 | 185 | 0.867 | 6.55 |
| 54 | 97.521 | 1.066 | 1.413 | 19 | 39 | 310 | 5.0 | 200 | 0.938 | −8.14 |

V comparative experiment

INDUSTRIAL APPLICABILITY

By the method of the invention, it is possible to obtain coated steel strips featuring a particularly high-quality surface structure. Therefore, these steel strips can be used advantageously in the automotive sector.

The invention claimed is:
1. A steel strip that has been provided with a corrosion-protective coating, produced by a method comprising:
heating the steel strip to a temperature $T_1$ of 400° C. to 500° C.;
(A) conducting the steel strip having temperature T1 through a melt bath having a temperature $T_2$, containing the elements of the corrosion-protective coating in molten form, in order to obtain a coated steel strip, and
(B) stripping the coated steel strip by means of at least one nozzle that emits a stripping gas having a temperature $T_3$ at an angle a in the direction of the coated steel strip,
wherein a value Q is ≤6.956 with

$$Q = \frac{3.76 + (\alpha * (10 + 6.3 * h))}{10 - 0.86 * T_3^2 + 4.82 * \Delta T} \quad (I)$$

in which
- α is the angle between a theoretical straight line perpendicular to the coated steel strip and pointing through the middle of the at least one nozzle, and the nozzle direction set, in °,
- h is the distance between the surface of the melt bath and the lower edge of the nozzle in mm,
- $T_3$ is the temperature of the stripping gas in ° C., and
- ΔT is the difference between the temperature $T_2$ of the melt bath and the temperature $T_1$ of the steel strip in ° C., wherein the method concludes without a heat treatment for producing an alloy layer on the steel strip, and
wherein the steel strip is a bake-hardened steel or an IF steel.

2. The steel strip as claimed in claim 1, wherein the corrosion-protective coating, in addition to Zn and unavoidable impurities, contains 0.1% to 2.0% by weight of Al.

3. The steel strip as claimed in claim 2 wherein the melt bath further contains 0.1% to 3% by weight of Mg.

4. The steel strip as claimed in claim 2 wherein the corrosion-protective coating further contains 0.1% to 3% by weight of Mg.

5. The steel strip of claim 1 wherein the melt bath, as well as Zn and unavoidable impurities, contains 0.1% to 2.0% by weight of Al.

6. The steel strip of claim 1 wherein the steel strip, as well as Fe and unavoidable impurities, contains (all figures in % by weight)
- to 0.3 C,
- to 1.50 Si,
- to 4.00 Mn,
- to 0.10 P,
- to 0.02 S,
- to 2.20 Al,
- up to 0.2 Ti+Nb,
- up to 1.50 Cr+Mo,
- up to 0.25 V,
- up to 0.01 N,
- to 0.20 Ni,
- up to 0.01 B and
- up to 0.01 Ca.

7. The steel strip of claim 1 wherein the corrosion-protective coating has a thickness of 1 to 10 μm, and wherein the steel strip is a single phase steel.

8. The steel strip of claim 1 wherein the coating includes Zn, Mg, Al, and wherein $Fe_2Al_5$ particles are present in the coating and have an average grain diameter of ≤210 nm.

9. The steel strip of claim 1 wherein $T_3$ is 15 to 50° C.

10. The steel strip of claim 1 wherein α is −5.0° to 5.0°.

11. The steel strip of claim 1 wherein the coating includes Zn, Mg, Al, and wherein $Fe_2Al_5$ particles are present in the coating and have an average grain diameter of ≤565 nm.

12. The steel strip of claim 1 wherein a distance between the steel strip and the lower edge of the at least one nozzle is 4 mm to 15 mm.

13. The steel strip of claim 1 wherein a pressure p of stripping gas leaving the nozzle is 50 mbar to 800 mbar.

14. The steel strip as claimed in claim 1, wherein the coating has a ratio of Wsa_mod in longitudinal direction to Wsa_mod in cross direction of 0.700 to 1.290.

15. A steel strip that has been provided with a corrosion-protective coating, produced by a method comprising:
- (A) conducting the steel strip having a temperature $T_1$ through a melt bath having a temperature $T_2$, containing the elements of the corrosion-protective coating in molten form, in order to obtain a coated steel strip, and
- (B) stripping the coated steel strip by means of at least one nozzle that emits a stripping gas having a temperature $T_3$ at an angle a in the direction of the coated steel strip, wherein a value Q is 6.956 with $$Q = \frac{3.76 + (\alpha * (10 + 6.3 * h))}{10 - 0.86 * T_3^2 + 4.82 * \Delta T} \quad (I)$$

in which
- α is the angle between a theoretical straight line perpendicular to the coated steel strip and pointing through the middle of the at least one nozzle, and the nozzle direction set, in °,
- h is the distance between the surface of the melt bath and the lower edge of the nozzle in mm,
- $T_3$ is the temperature of the stripping gas in ° C., and
- ΔT is the difference between the temperature $T_2$ of the melt bath and the temperature $T_1$ of the steel strip in ° C.

wherein a is −5.0° to 5.0°;
wherein h is 50 mm to 800 mm;
wherein $T_1$ is heated to 400° C. to 550° C. prior to step (A),
wherein $T_2$ is 400° C. to 650° C.,
wherein $T_3$ is 15° C. to 50° C.;
wherein ΔT is −60° C. to 120° C.;
wherein a distance between the steel strip and the lower edge of the nozzle is 4 mm to 15 mm;
wherein a pressure p of stripping gas leaving the nozzle is 50 mbar to 800 mbar;
wherein a thickness of the corrosion-protective coating after step (B) is 0.1 μm to 20 μm,
wherein the method concludes without a heat treatment for producing an alloy layer on the steel strip, and
wherein the steel strip is a bake-hardened steel or an IF steel.

16. The steel strip of claim 15, wherein:
wherein $Fe_2Al_5$ particles are present in the coating and have an average grain diameter of ≤565 nm;
wherein α is −4.0° to 4.0°;
wherein h is 80 mm to 700 mm;
wherein $T_3$ is 20° C. to 40° C.;
wherein ΔT is −55° C. to 115° C.;
wherein the distance between the steel strip and the lower edge of the nozzle is 6 mm to 12 mm;
wherein p is 100 mbar to 600 mbar; and
wherein a thickness of the corrosion-protective coating after step (B) is 1.0 μm to 10 μm.

* * * * *